United States Patent
Afsar et al.

(10) Patent No.: US 6,401,193 B1
(45) Date of Patent: Jun. 4, 2002

(54) DYNAMIC DATA PREFETCHING BASED ON PROGRAM COUNTER AND ADDRESSING MODE

(75) Inventors: Muhammad Afsar; Klaus Oberlaender, both of San Jose, CA (US)

(73) Assignee: Infineon Technologies North America Corp., San Jose, CA (US)

(*) Notice: Subject to any disclaimer, the term of this patent is extended or adjusted under 35 U.S.C. 154(b) by 0 days.

(21) Appl. No.: 09/178,052

(22) Filed: Oct. 26, 1998

(51) Int. Cl.$^7$ ................................. G06F 9/30
(52) U.S. Cl. ........................................ 712/207
(58) Field of Search ........................... 712/207, 237

(56) References Cited

U.S. PATENT DOCUMENTS

| | | | | |
|---|---|---|---|---|
| 4,926,323 A | | 5/1990 | Baror et al. ............... 364/200 |
| 5,210,838 A | * | 5/1993 | Jensen ....................... 395/400 |
| 5,367,656 A | | 11/1994 | Ryan ......................... 395/425 |
| 5,694,568 A | | 12/1997 | Harrison, III et al. .. 395/421.03 |
| 5,704,053 A | | 12/1997 | Santhanam ................ 284/383 |
| 5,778,435 A | * | 7/1998 | Berenbaum et al. ........ 711/137 |
| 5,784,711 A | * | 7/1998 | Chi ............................ 711/213 |
| 5,790,823 A | | 8/1998 | Puzak et al. ............... 395/383 |
| 5,822,757 A | * | 10/1998 | Chi ............................ 711/129 |
| 5,829,028 A | * | 10/1998 | Lynch et al. ............... 711/126 |
| 6,055,622 A | * | 4/2000 | Spillinger .................. 712/207 |

FOREIGN PATENT DOCUMENTS

EP  0 496 439 A2  7/1992

OTHER PUBLICATIONS

Chen et al., "Effective Hardware–Based Data Prefetching for High–Performance Processors", IEEE, pp. 609–623, 1995.*

* cited by examiner

*Primary Examiner*—John A. Follansbee
(74) *Attorney, Agent, or Firm*—Fish & Richardson P.C.

(57) ABSTRACT

Prefetching data to a low level memory of a computer system is accomplished utilizing an instruction location indicator related to an upcoming instruction to identify a next data prefetch indicator and then utilizing the next data prefetch indicator to locate the corresponding prefetch data within the memory of the computer system. The prefetch data is located so that the prefetch data can be transferred to a primary cache where the data can be quickly fetched by a processor when the upcoming instruction is executed. The next data prefetch indicator is generated by carrying out the addressing mode function that is embedded in an instruction only when the addressing mode of the instruction is a deterministic addressing mode such as a sequential. The next data prefetch indicator, preferably in the form of an effective address, is identified by the instruction location indicator, preferably in the form of a program counter, by relating calculated next effective addresses to corresponding program counter tags in a searchable table.

20 Claims, 4 Drawing Sheets

| PC TAG | NEXT DATA PREFETCH INDICATOR | SOURCE ADDRESSING MODE | VALID |
|---|---|---|---|
| • | • | • | • |
| • | • | • | • |
| • | • | • | • |
| • | • | • | • |
| • | • | • | • |
| PC TAG | NEXT DATA PREFETCH INDICATOR | SOURCE ADDRESSING MODE | VALID |

100

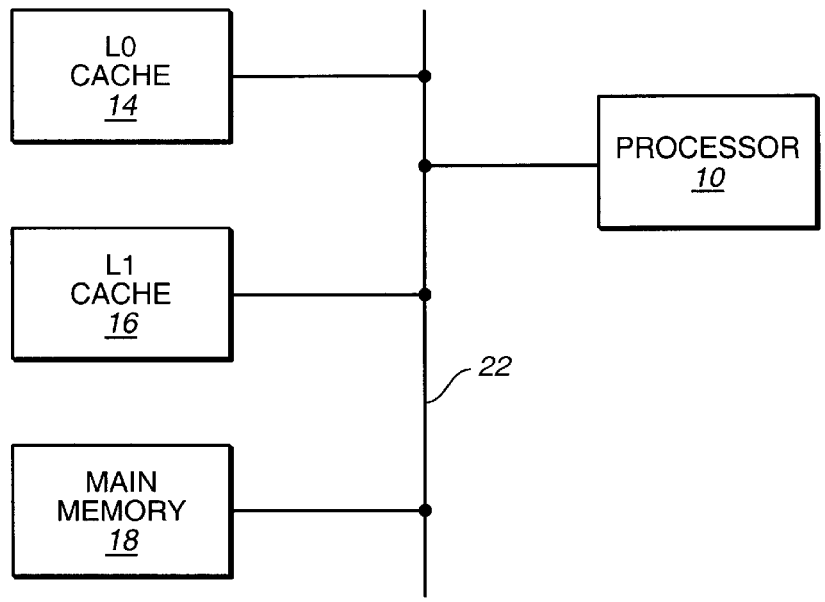
FIG._1 (PRIOR ART)
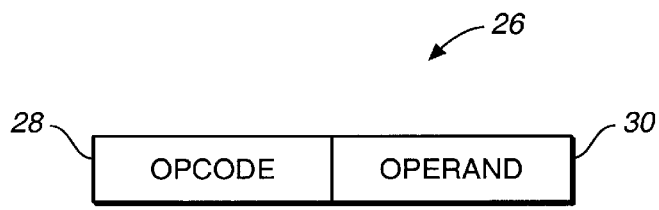
FIG._2 (PRIOR ART)
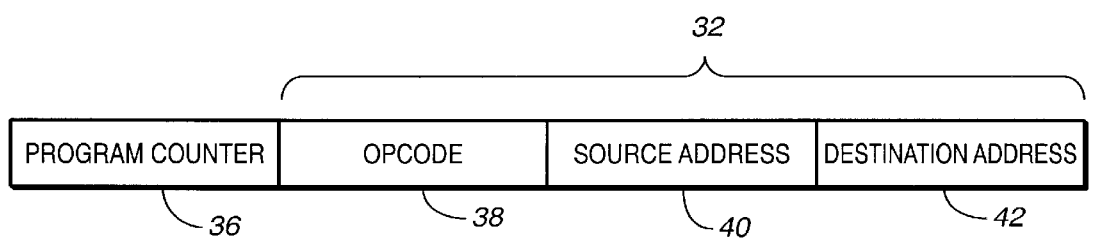
FIG._3 (PRIOR ART)

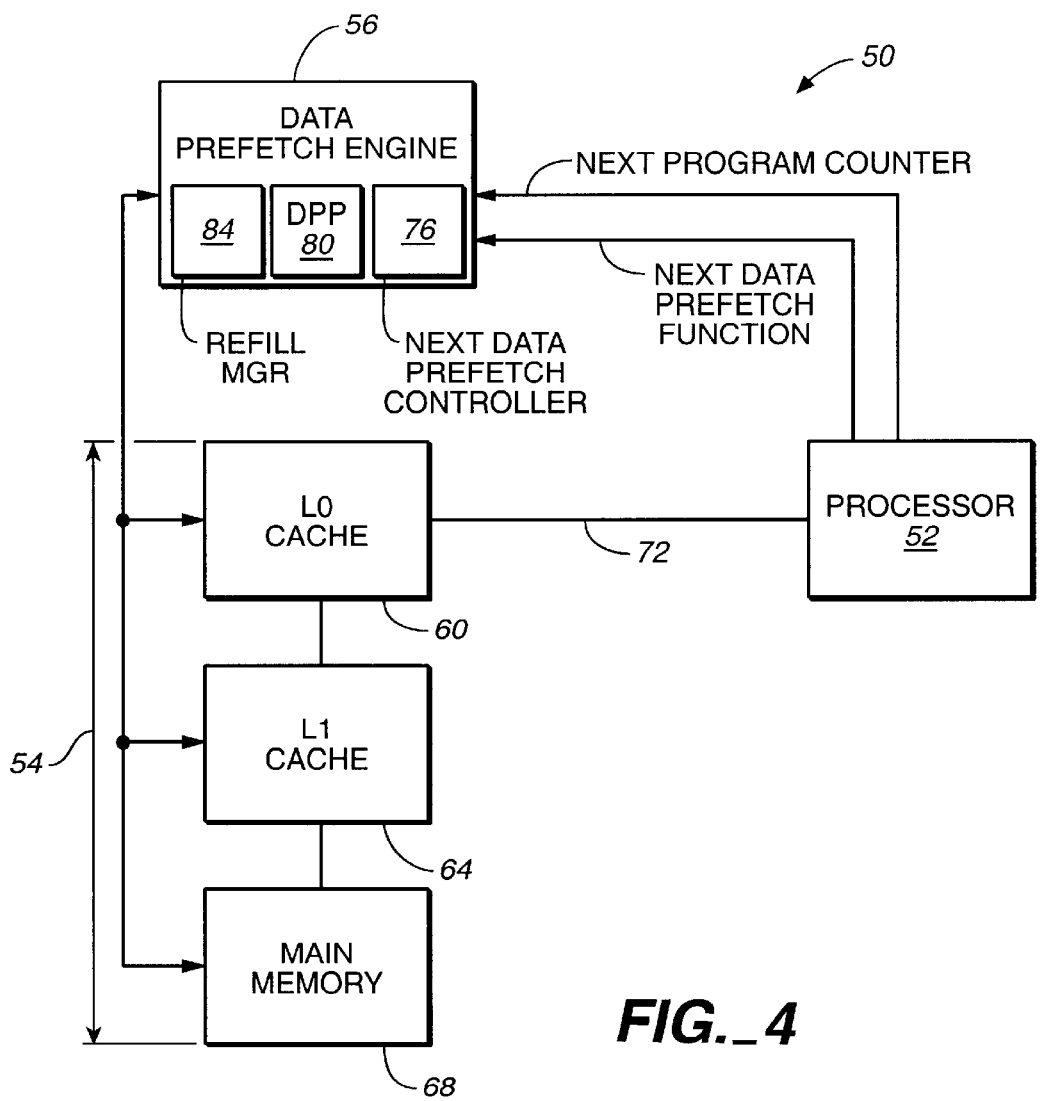
FIG._4
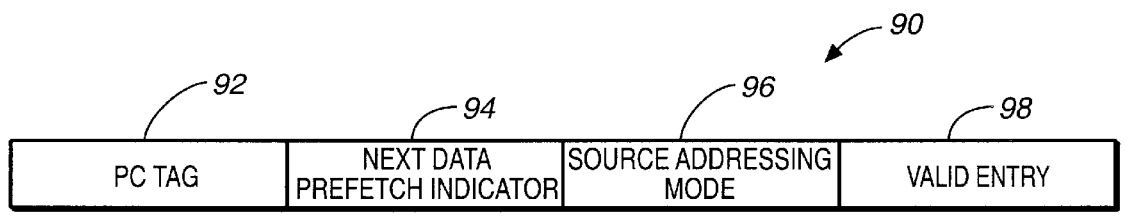
FIG._5

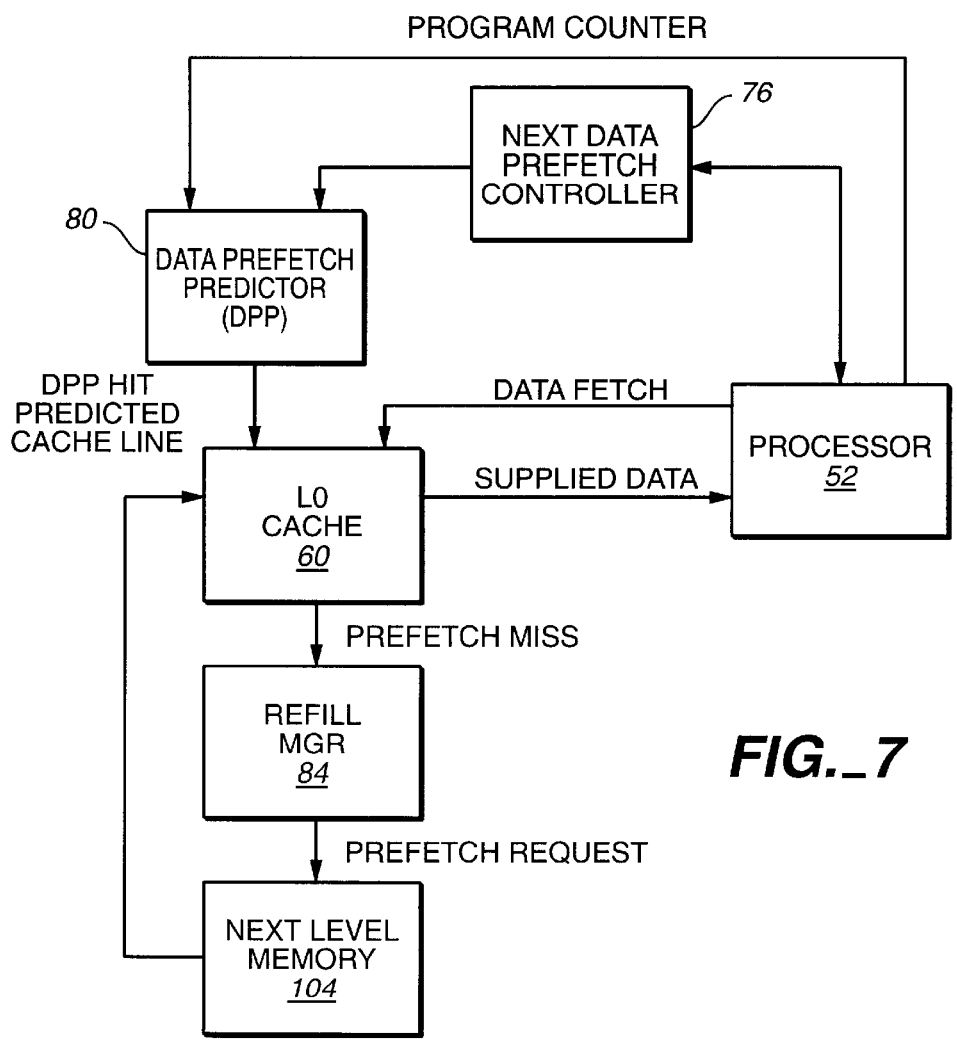
FIG._6
FIG._7

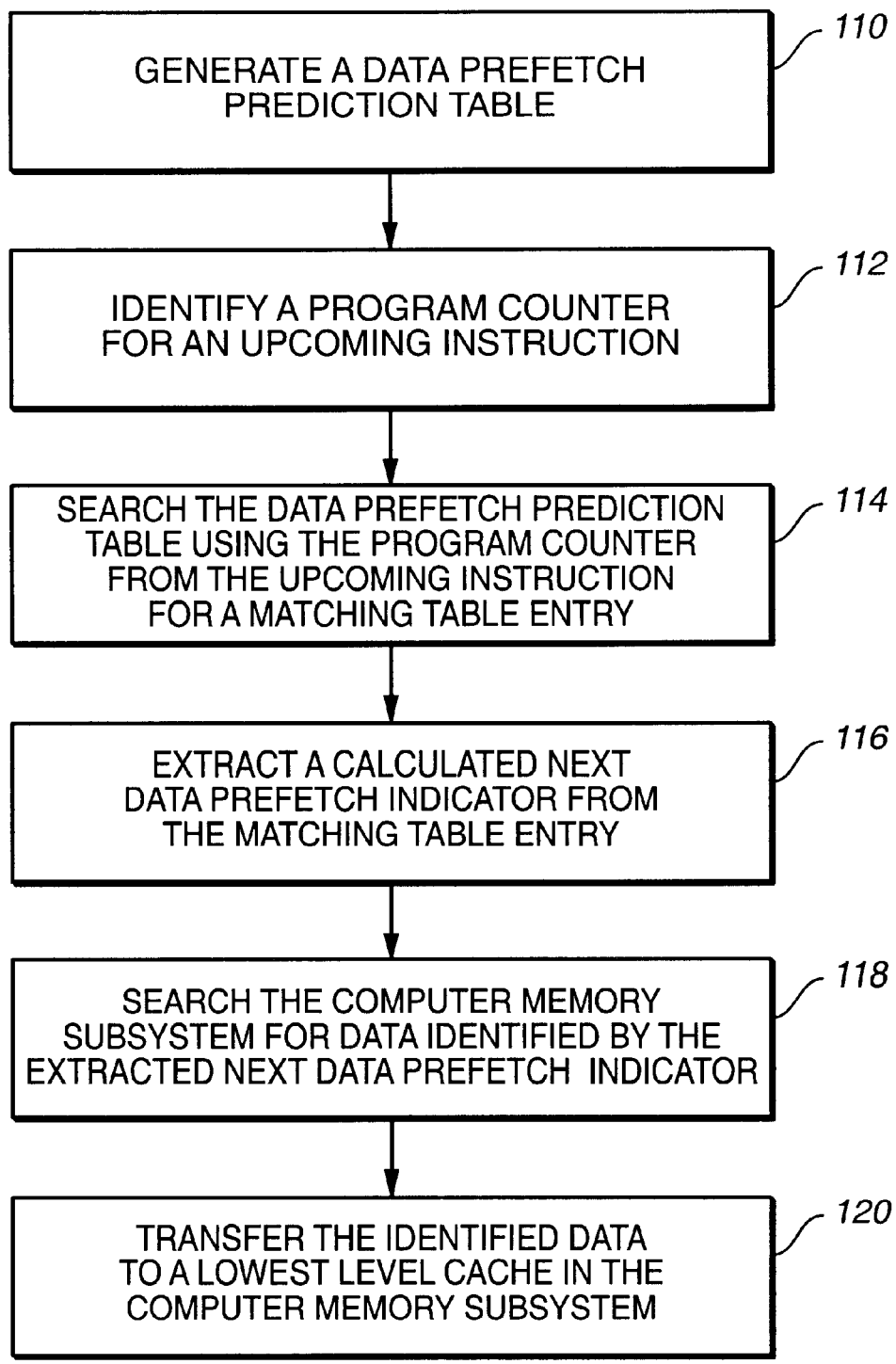
FIG._8

DYNAMIC DATA PREFETCHING BASED ON PROGRAM COUNTER AND ADDRESSING MODE

BACKGROUND OF THE INVENTION

The invention relates generally to the prefetching of data for access by a processor. More particularly, the invention relates to predicting the next data fetch so that the predicted data can be prefetched to the lowest level cache before the predicted data is requested by the processor.

DESCRIPTION OF THE RELATED ART

Processor instruction execution speeds are much faster than the time required to access instructions from a computer's main memory. The slower main memory access time can create performance bottlenecks when a processor is forced to wait for fetched instructions to be transferred from the main memory to the processor. To minimize the gap between processor speed and main memory access time, higher speed cache memory is used to temporarily buffer instructions such that cached instructions are supplied to the processor with minimal time delay. FIG. 1 is a depiction of a typical processor and memory arrangement that utilizes multilevel cache memory to supply a processor. In FIG. 1, the processor 10 is connected to a level zero (L0) cache 14, a level one (L1) cache 16, and a main memory 18 by a bus 22. Other configurations are possible and may have, for example, the L0 cache located on the same chip as the processor and connected to the processor by on-chip circuitry or the cache levels may be directly connected to the processor. The processor can be any processor, often referred to as a microprocessor or a central processing unit, that processes computer code such as assembly language code. The cache memory is often high speed memory, such as static random access memory (SRAM), and the main memory can be, for example, dynamic random access memory (DRAM), and/or flash memory. The cache memory is typically more expensive to build than the main memory and therefore, the cache memory is usually sized to store only a small portion of the main memory storage capacity.

In typical computer systems, assembly language instructions are delivered to the processor from memory and then executed by the processor. Referring to FIG. 2, a typical assembly language instruction 26 includes an opcode portion 28 and an operand portion 30. The opcode, for operation code, informs the processor of what operation is to be performed. Opcode instructions include, for example, load instructions, add instructions, and subtract instructions. Referring to FIG. 3, a typical instruction 32 includes an opcode 38 that is referenced by a program counter (PC) 36. The program counter is an instruction location indicator that identifies the address within the memory of the desired instruction and the instruction directs the performance of functions, such as loading data, adding data, or subtracting data. The operand includes the symbolic name for the memory address of the data that is to be operated on by the instruction or in some cases the memory addresses of another instruction. Referring to FIG. 3, the operand may include information on the source address 40 or addresses and the destination address 42 or addresses, where the source address is the location of the data that is to be operated on by the instruction, and where the destination address is the target location for data that is the result of the current operations. The source and destination addresses may include addressing modes, where the addressing modes are algorithms that determine the proper source or destination address for data stored within the memory. Data addressing modes can be categorized as random access addressing modes or deterministic addressing modes. Random access addressing modes include absolute addressing, register indirect addressing, and base plus offset addressing. Deterministic addressing modes include sequential addressing modes such as register indirect addressing with pre/post incrementing, circular addressing, and/or bit reverse addressing.

Referring back to FIG. 1, since cache memory cannot store the total volume of information that is stored in the main memory 18, all of the information required by the processor 10 cannot be stored in the L0 cache 14 at the same time and cache misses will result when the processor fetches data that is not stored in the L0 cache. In order to increase the L0 cache hit ratio, instructions and/or data can be prefetched from the main memory to the L0 cache 14 or L1 cache 16 in anticipation of a data fetch by the processor. Prefetching of instructions to the cache is made easier by the sequential nature of computer program instruction execution. That is, computer programs often run routines that utilize program instructions in sequential order and as a result, a string of instructions can be prefetched from the main memory to the cache with some degree of confidence that the instructions will soon be needed by the processor. Branch target buffers can be used for prefetching instructions that do not exhibit sequential characteristics.

In contrast to prefetching instructions, data is often accessed in more of a random nature, such that prefetching is more difficult to perform. One common technique used in prefetching data is that when a cache miss occurs, the current cache line is filled from the main memory with the desired prefetch data and a next cache line is filled with a block of data from the main memory that is spatially close to the missed data. Although the block caching approach may work well for some applications, it has disadvantages. Specifically, the block of supplemental data is prefetched from the main memory without any knowledge of the data access pattern of the current program and as a consequence, if the currently accessed data element is not part of a sequential data structure, the data prefetch may be filling the cache with unneeded data in the place of data that may soon be needed by the processor.

In addition to block data prefetching, other techniques for data prefetching involve recognizing access patterns that have developed from previous data accesses and then extrapolating the recognized pattern to generate new prefetch addresses. For example, a pattern recognition technique is disclosed in U.S. Pat. No. 5,694,568, entitled "Prefetch System Applicable to Complex Memory Access Schemes," issued to Harrison, III et al. Although this technique may work well for its intended purpose, the technique relies on recognizing access patterns based on past data accesses where the past patterns may inaccurately predict future data access patterns.

In view of the shortcomings of the known prior art, what is needed is a method and apparatus for prefetching data that provide a high cache hit ratio.

SUMMARY OF THE INVENTION

A method and apparatus for prefetching data to a low level memory of a computer system utilize an instruction location indicator related to an upcoming instruction to identify a next data prefetch indicator and then utilize the next data prefetch indicator to locate the corresponding prefetch data within the main memory of the computer system. The prefetch data is located so that the prefetch data can be transferred to the low level memory, where the data can be quickly accessed by a processor before the upcoming instruction is executed. The next data prefetch indicator is generated by carrying out the addressing mode function that is embedded in an instruction only when the addressing mode of the instruction is a deterministic addressing mode such as a sequential addressing mode. The next data prefetch indicator is identified by the instruction location indicator by relating corresponding next data prefetch indicators to instruction location indicators in a searchable table.

In the preferred embodiment, a data prefetch prediction table is generated that enables the next data prefetch indicator to be identified based on the program counter of an instruction that is soon to be executed. Entries in the data prefetch prediction table are formed from instructions that utilize deterministic addressing modes for identifying the effective address of the source data. The data prefetch prediction table entries include a program counter tag and a next data prefetch indicator. The program counter tag is the program counter related to the present instruction and the program counter tag allows the data prefetch prediction table to be searched by the program counter that is related to a particular instruction. The next data prefetch indicator is the effective address of the data that is likely to be required the next time the same instruction is executed. The next data prefetch indicator is calculated by carrying out the addressing mode function that is associated with the instruction. Since the addressing mode function is a deterministic function, there is a high likelihood that the calculated next effective address will be the actual effective address that is fetched the next time the instruction with the same program counter value is executed.

The elements of a computer system in accordance with a preferred embodiment of the invention include a processor, a level zero cache, a level one cache, a main memory, and a data prefetch engine. In the preferred embodiment, the processor is any conventional processor having a program counter that identifies the address of instructions that are to be executed. The level zero cache is preferably SRAM that provides the fastest data transfer rate to the processor and that is located physically close to the processor. The level one cache is preferably SRAM that provides a slower data transfer rate to the processor and that is located on a system mother-board connected to the processor by a system bus. The main memory is a large capacity memory that provides a relatively slow transfer of data to the processor. The main memory may include DRAM, flash memory or other suitable memory types. The main memory is connected to the processor by a system bus.

The data prefetch engine is preferably integrated with the processor and manages the prefetching of data between the level zero cache, the level one cache, and the main memory. The data prefetch engine utilizes a next data prefetch controller, a data prefetch predictor, and a refill manager to predict the effective address of the next desired data memory reference and to transfer the data corresponding to the predicted data memory reference to the lowest level cache in order to create the best chance for a cache hit upon the execution of a particular instruction.

The next data prefetch controller screens out instructions having non-deterministic addressing modes and uses instructions having deterministic addressing modes such as sequential addressing modes to build a data prefetch prediction table that is used to predict the next prefetch. Generation of a data prefetch prediction table entry involves calculating the next effective address related to the present instruction by carrying out the addressing mode function related to the present instruction. The data prefetch predictor utilizes the data prefetch prediction table formed by the next data prefetch controller to rapidly identify the next effective address for a data prefetch related to an upcoming instruction. The data prefetch predictor maintains the data prefetch prediction table in a content-addressable memory that can be quickly searched by program counter tag. A refill manager of the data prefetch engine is responsible for transferring prefetch data that is not found in the lowest level cache to the lowest level cache when a prefetch miss occurs at the lowest level cache. The refill manager generates prefetch requests for higher level memory until the desired prefetch data is located and transferred to the lowest level cache.

In operation, the next data prefetch controller generates the data prefetch prediction table utilizing executed instructions that exhibit deterministic addressing modes. The data prefetch prediction table is located in the data prefetch predictor and is constantly updated by the next data prefetch controller. When a new instruction is identified as an instruction that will soon be executed, the program counter related to the instruction is forwarded to the data prefetch predictor. The program counter related to the instruction is used by the data prefetch predictor to search the program counter tag column of the data prefetch prediction table for a matching program counter tag. If a matching program counter tag is identified, the next data prefetch indicator is extracted from the table entry and the indicator is used to search the lowest level cache in the computer system for a cache line that matches the effective address of the next data prefetch indicator. If a cache hit occurs in the lowest level cache, no further prefetching is required. On the other hand, if a cache miss occurs in the lowest level cache, then the refill manager generates a prefetch request utilizing the next data prefetch indicator that enables the higher level memories to be searched for data with the corresponding effective address. Once the data with the corresponding next effective address is located, the refill manager transfers the located data to the lowest level cache in the computer system. With the target prefetch data transferred to the lowest level cache, the prefetch process related to the current instruction is complete. When the current instruction is finally executed by the processor, there is a higher probability that the data requested by the current instruction will be located in the lowest level cache, thereby allowing the fastest data access time possible.

BRIEF DESCRIPTION OF THE DRAWINGS

FIG. 1 is a depiction of a processor and multilevel memory in accordance with the prior art.

FIG. 2 is a depiction of an assembly-language instruction in accordance with the prior art.

FIG. 3 is a depiction of specific parts of an assembly-language instruction in accordance with the prior art.

FIG. 4 is a depiction of a processor, a multilevel memory, and a data prefetch engine in accordance with the invention.

FIG. 5 is a depiction of a data prefetch prediction table entry in accordance with the invention.

FIG. 6 is a depiction of a data prefetch prediction table in accordance with the invention.

FIG. 7 is a flow diagram of the interaction between elements of the system of FIG. 4 in accordance with the invention.

FIG. 8 is a process flow diagram of a preferred method of the invention.

DETAILED DESCRIPTION

FIG. 4 is a depiction of the preferred architecture of a computer system 50 in accordance with the invention. The preferred architecture includes a processor 52, a data prefetch engine 56, a level zero (L0) cache 60, a level one (L1) cache 64 and a main memory 68. In the preferred embodiment, the processor is any conventional processor, including a processor that can generate one or more data memory references in a single clock cycle. The processor includes a program counter that identifies the address of instructions that are to be executed, an instruction decoder that separates the operand from the opcode and converts the opcode into a series of electronic signals that execute the command represented by the opcode, an address decoder that determines the physical location of required data within the memory, an accumulator that temporarily stores values, and an arithmetic logic unit that performs the mathematical functions of the processor.

The preferred architecture of the computer system 50 includes a memory subsystem 54, with a multilevel cache arrangement where the levels of cache memory are differentiated by size and latency. The L0 cache 60 (also known as the primary cache) provides the fastest data transfer rate to the processor 52. The L0 cache is located physically close to the processor and is preferably SRAM. Although for description purposes the L0 cache is shown as connected to the processor by a bus 72, the L0 cache is preferably integrated onto the processor chip and connected to the processor by on-chip high bandwidth circuitry. The L1 cache 64 (also known as the secondary cache) has a larger storage capacity than the L0 cache, but provides a slower data transfer rate to the processor. The L1 cache is preferably on-chip SRAM, although it may be another form of memory such as SRAM that is integrated into the system RAM located on a system motherboard. In the preferred embodiment, the L0 cache memory and the L1 cache memory store only operand data that is needed by the processor and opcode instructions needed by the processor are stored in a separate cache that is not depicted. Although a split cache arrangement is described, a unified cache which combines both data and instructions can also be implemented. The L0 cache typically ranges from 1 Kb to 64 Kb and the L1 cache typically ranges from 64 Kb to 1 Mb, although this is not critical. Although the two level cache arrangement is described other cache arrangements are possible, including for example, multiple cache levels (1 to x) and/or cache memory that is connected to a processor in some other manner. The exact cache configuration is not critical to the invention.

The main memory 68 is a large capacity memory that provides a relatively slow data transfer rate to the processor 52. The main memory may include DRAM, SRAM, flash memory and FRAM. The memory subsystem may be further connected to input/output devices, such as magnetic memory. The main memory is also connected to the processor by the bus 72.

The preferred architecture of the computer system 50 includes the data prefetch engine 56 that manages the prefetching of data between the L0 cache 60, the L1 cache 64, and the main memory 68. The data prefetch engine is the focus of the invention and utilizes a next data prefetch controller 76, a data prefetch predictor 80, and a refill manager 84 to predict the effective address of the next desired data memory reference and to transfer the data corresponding to the predicted data memory reference to the lowest level cache in order to create the best chance for a cache hit upon the execution of a given instruction.

The first unit in the data prefetch engine 56 is the next data prefetch controller 76. The next data prefetch controller examines program instructions and uses selected instructions to build a data prefetch prediction table that is used to predict the next data prefetch. The next data prefetch controller selection process involves examining an instruction line, preferably related to an executed instruction, for a particular characteristic. Specifically, the next data prefetch controller examines the addressing mode associated with the source address that is embedded in the instruction, looking for addressing modes that fall into the deterministic addressing mode category. In the preferred embodiment, the addressing mode is identified by a 3-bit vector and the addressing mode vector of the instruction is fed through a hardwired comparator to determine if the addressing mode vector matches any pre-established deterministic addressing mode vectors that have been identified through a system setup. In the preferred embodiment, deterministic addressing modes include sequential addressing modes such as pre and post incrementing, circular addressing, and bit reverse addressing modes.

If the addressing mode vector of an instruction identifies a deterministic addressing mode, the instruction is further processed into a data prefetch prediction table entry that is then used to create the data prefetch prediction table. However, if the addressing mode vector identifies a non-deterministic addressing mode, then the instruction is not considered further in the present prefetch process. Instructions utilizing deterministic addressing modes are incorporated into the data prefetch prediction table because they provide a known function that can be used to calculate the effective address that will be identified the next time the same instruction is called upon to be executed. In programs that loop back to the same instruction many times, the next effective address prediction often corresponds to the actual effective address fetch, creating a higher cache hit ratio.

Generation of a data prefetch prediction table entry is performed by the next data prefetch controller 76 and involves calculating the next effective address related to the present instruction using the deterministic addressing mode that is identified in the instruction. A preferred data prefetch prediction table entry 90 is depicted in FIG. 5 and includes the following vectors; a program counter tag 92, a next data prefetch indicator 94, the source addressing mode 96, and a valid entry vector 98. The program counter tag is the program counter related to the present instruction. The program counter tag allows the data prefetch prediction table to be searched by the program counter that is related to a particular instruction. The next data prefetch indicator is a vector that identifies the effective address of the next cache line that would be requested when, for example, the sequential addressing mode function of the present instruction is carried out to calculate the next effective address. An example of calculating a next effective address (EA) under a post-incrementing addressing mode is as follows:

current $EA = A_0$ next $EA = A_0 + \text{constant}$.

An example of calculating a next effective address under a pre-incrementing addressing mode is as follows:

current $EA = A_0 + \text{constant}$ $A_0 = A_0 + \text{constant}$, and next $EA = A_0 + \text{constant} + \text{constant}$.

The number of bits in the next data prefetch indicator vector required to identify an effective address is a function of the memory organization of the computer system. In the preferred embodiment, the next data prefetch indicator vector is 12 bits.

The source addressing mode vector 96 in the data prefetch prediction table entry is a vector that represents the addressing mode of the data prefetch prediction table entry. It is already known that the source addressing mode falls into the deterministic addressing mode category because the instruction would have been screened out if the instruction had a non-deterministic addressing mode. However, the addressing mode is included in the data prefetch prediction table entry because knowing the particular addressing mode that is involved may be helpful in fine tuning the system. The valid entry vector 98 of a table entry is a 1-bit vector that identifies the data prefetch prediction table entry as a valid entry. Although the source addressing mode vector is not critical to the invention, it is included in the preferred embodiment to enhance performance. The source addressing mode can be removed from the table entry in order to decrease the table entry size.

Referring back to FIG. 4, the next unit in the data prefetch engine 56 is the data prefetch predictor (DPP) 80. The data prefetch predictor utilizes the data prefetch prediction table formed from multiple table entries to rapidly identify the next effective address for data prefetching. The data prefetch predictor maintains the data prefetch prediction table in memory such as content-addressable memory that can be quickly searched by the program counter tag. FIG. 6 is a depiction of an exemplary data prefetch prediction table 100 having multiple table entries. The data prefetch prediction table is handled like a normal cache since it cannot store all of the instructions. Cache replacement mechanisms such as direct mapped, 2-way set associative, fully set associative, or any other cache replacement mechanism can be used.

The next unit in the data prefetch engine 56 is the refill manager 84. The refill manager is responsible for transferring prefetch data that is found in higher level memory to the lowest level cache. The refill manager recognizes when a prefetch miss occurs at the lowest level cache and then generates prefetch requests for higher level memory until the target prefetch data is located and transferred to the lowest level cache. It should be noted that although the functions of the data prefetch engine are depicted as separate from the processor 52 for description purposes, in the preferred embodiment the subunits of the data prefetch engine are integrated onto the same chip as the processor.

Operation of the computer system 50 of FIG. 4 is described with reference to FIG. 7. FIG. 7 is a flow diagram that depicts the interaction between the elements described with reference to FIG. 4 with like elements having the same reference numerals. To begin the prefetch process, data reference behavior is tracked in order to develop the data prefetch prediction table. To generate the data prefetch prediction table, the next data prefetch controller 76 selects executed instructions from the processor 52 that utilize deterministic addressing modes to generate effective addresses as the next data prefetch indicators. Data prefetch prediction table entries as shown in FIG. 5 are generated from the executed instructions by carrying out the addressing mode function of an instruction to calculate the effective address of the data that is predicted to be needed next by the processor. The generated table entries are forwarded to the data prefetch predictor to generate the data prefetch prediction table. Once an initial data prefetch prediction table is generated, the table is continuously updated.

After the data prefetch prediction table is generated, a program counter is transferred from the processor 52 to the data prefetch predictor 80. The program counter is a look-ahead program counter that represents an upcoming instruction that is soon to be executed. The program counter is fed into the data prefetch predictor and is used to search the program counter tag column of the data prefetch prediction table for a matching program counter tag. If the current program counter from the processor matches a program counter tag of the data prefetch prediction table, then the data prefetch prediction table supplies the next effective address that is used to search the highest priority cache, for example the L0 cache 60, for a matching cache line. On the other hand, if no matching table entry is found in the data prefetch prediction table, then the prefetch can be continued under another approach, such as block prefetching, or the prefetch can be discontinued.

Searching the L0 cache 60 involves utilizing the next data prefetch indicator, specifically the next effective address, extracted from the matching data prefetch prediction table entry to see if the identified cache line already exists in the L0 cache. If the cache line identified by the calculated next effective address already exists in the L0 cache, then no further action is required because the data that is likely to be required by a next instruction is already located in the memory location that provides the quickest data access to the processor 52. On the other hand, if the cache line does not exist in the L0 cache, then there is a prefetch miss and the refill manager 84 is called upon to locate the prefetch data and transfer the data to the L0 cache. The cache memory is preferably searched on a priority basis with the lowest level cache having the highest priority and the highest level cache having the lowest priority.

When a prefetch miss occurs in the L0 cache 60, the refill manager 84 generates a prefetch request and forwards the prefetch request to the next lower level memory 104, for example the L1 cache. If the desired prefetch data exists in a cache line of the L1 cache, then the cache line identified by the calculated effective address is transferred to the L0 cache and the prefetch is complete. If, on the other hand, the prefetch data does not exist in a cache line of the L1 cache, then the refill manager forwards a prefetch request to the next lower level memory, in this case the main memory. Once the prefetch data is found in the main memory, the data can be transferred to the L0 or L1 cache as needed. Because of the delay caused by the L0 and L1 cache misses, the system may incur cycle penalties in spite of the prefetch effort. However, if the prefetch is able to bring the predicted data to the L0 cache and the processor 52 does end up fetching the predicted data, then the efficiency of the processor is enhanced by the prefetching process because the data access time for data supplied to the processor has been minimized. If the prefetched data is not requested by the instruction execution, then the prefetch algorithm has been unsuccessful at predicting the data required by the current instruction. The prefetch process is rapidly repeated during the operation of the processor. A scheme can also be implemented where the prefetch could be canceled if it is recognized that the entry in the prediction table doesn't match the real address of the instruction with the same program counter tag, thereby lowering the penalty for misprediction. Further, the reason for the misprediction can be determined and the table entry can be removed before it creates another misprediction.

FIG. 8 is a process flow diagram of a preferred method of the invention. In a first step 110, a data prefetch prediction table is generated. The data prefetch prediction table relates program counter values to effective addresses that are calculated using the deterministic addressing mode function related to an instruction. In a next step 112, a program counter for an upcoming instruction is identified. The program counter is a look-ahead counter that enables the necessary data to be prefetched. In a next step 114, the data prefetch prediction table is searched using the program counter from the upcoming instruction to find a matching entry from the data prefetch prediction table. In a next step 116, a calculated next data prefetch indicator, in the form of an effective address, is extracted from the matching data prefetch prediction table entry in order to search the computer memory subsystem for the desired data. In a next step 118, the computer memory subsystem is searched for data identified by the extracted next data prefetch indicator. In a next step 120, once the desired data is located within the computer memory subsystem, the desired data is transferred to the lowest level cache, if the data is not already present in the lowest level cache.

What is claimed is:

1. A method for prefetching data to a low level memory of a computer system that includes a processor and multiple memory levels comprising the steps of:

generating data prefetch prediction information for a plurality of instructions that utilize a deterministic source addressing mode, including utilizing said deterministic source addressing mode as a basis for identifying associations between instruction location indicators for locating said instructions and next data prefetch indicators for locating data to be prefetched, such that said deterministic addressing mode is used with each said instruction to calculate a particular next data prefetch indicator to be associated with the particular instruction location indicator for locating said instruction, wherein said data prefetch prediction information is generated to indicate said association between said particular next data prefetch indicator and said particular instruction location indicator;

storing said data prefetch prediction information in a manner that enables searching therethrough, said storing of said data prefetch prediction information being distinguishable from storing said instructions;

upon execution of a sequence of said instructions, identifying an instruction location indicator of a specific upcoming instruction;

utilizing said identified instruction location indicator of said specific upcoming instruction as a basis to execute a search of said data prefetch prediction information so as to identify a specific next data prefetch indicator associated with said identified instruction location indicator;

searching said memory levels of said computer system for data related to said specific next data prefetch indicator; and transferring said data related to said specific next data prefetch indicator to said low level memory of said computer system.

2. The method of claim 1 wherein said step of generating said data prefetch information includes:

distinguishing first instructions for which said deterministic source addressing mode is embedded from second instructions for which a random access source addressing mode is embedded;

carrying out a function of said deterministic source addressing mode for a plurality of said first instructions to generate said associated next data prefetch indicator for each said first instruction of said plurality of said first instructions; and creating a table entry corresponding to each said first instruction of said plurality, each said table entry being indicative of an instruction location indicator of said each first instruction and said generated next data prefetch indicator.

3. The method of claim 2 wherein said step of creating said table entries includes a step of storing said table entries in a table format in memory.

4. The method of claim 2 wherein said step of utilizing said identified instruction location indicator includes searching said table entries based upon said identified instruction location indicator to identify a corresponding table entry from said table entries.

5. The method of claim 4 wherein said step of utilizing said identified instruction location indicator is a step of utilizing a program counter value related to said specific upcoming instruction to search said table entries.

6. The method of claim 4 wherein said step of carrying out the function of said deterministic source addressing mode is a step of carrying out one of a pre-incrementing, a post-incrementing, circular addressing and/or a bit reverse addressing mode as indicated by a currently executed instruction.

7. The method of claim 1 wherein said step of searching said memory levels includes a step of searching a lowest level cache memory before any higher level memory.

8. The method of claim 1 wherein said step of searching said memory levels includes a step of searching said multiple memory levels in priority order from highest priority memory to lowest priority memory.

9. The method of claim 1 wherein said step of transferring includes a step of transferring said data related to said specific next data prefetch indicator to a lowest level cache of said computer system.

10. An apparatus for prefetching data to a low level memory of a computer system having multiple memory levels and a processor comprising:

means for generating a next data prefetch indicator for each of a plurality of computer instructions by carrying out a deterministic source addressing mode function for each said computer instruction, where said computer instruction has an instruction location indicator and an associated next data prefetch indicator that is calculated by carrying out said deterministic source addressing mode function for said computer instruction;

a store of table entries that correspond to said plurality of computer instructions, each table entry being indicative of said instruction location indicator and said associated next data prefetch indicator of a said computer instruction that corresponds to said table entry;

searching means for identifying a next data prefetch indicator for a soon to be executed computer instruction using the instruction location indicator of said soon to be executed computer instruction as a search mechanism through said table entries;

means for searching said memory levels of said computer system to locate data related to said identified next data prefetch indicator for said soon to be executed computer instruction; and means for transferring said located data related to said next data prefetch indicator for said soon to be executed computer instruction from a higher level memory to a lower level memory.

11. The apparatus of claim 10 further comprising a means for screening out computer instructions having non-deterministic addressing modes before generating a next data prefetch indicator.

12. The apparatus of claim 10 wherein said instruction location indicators are program counters and wherein said next data prefetch indicators are next effective addresses.

13. The apparatus of claim 10 wherein said lower level memory is cache memory that is co-located with said processor.

14. A method of prefetching operand data to a lowest level cache of a computer system having multiple memory levels and a processor comprising the steps of:

generating a data prefetch prediction table on a basis of deterministic source addressing functions of a plurality of program instructions such that said table includes table entries, with each table entry having a program counter tag related to an opcode instruction and a calculated next predicted effective address for operand data that is related to said opcode instruction, said calculated next predicted effective addresses being determined using said deterministic source addressing functions such that each said table entry is specific to (a) a particular program instruction, (b) a particular program counter tag that is assigned to said particular program instruction and (c) a particular calculated next predicted effective address that is determined by applying a particular deterministic source addressing function to said particular program instruction;

identifying a program counter for an upcoming opcode instruction;

searching said table entries of said generated data prefetch prediction table for a program counter tag that matches said program counter of said upcoming opcode instruction, thereby identifying a matching table entry;

extracting the calculated next predicted effective address from said matching table entry;

searching said multiple memory levels of said computer system for operand data identified by said calculated next predicted effective address that is extracted from said matching table entry; and transferring said operand data identified by said calculated next predicted effective address to said lowest level cache of said computer system.

15. The method of claim 14 wherein said step of generating said data prefetch prediction table includes a step of carrying out a specific said deterministic source addressing mode function embedded in each said particular program instruction for which a table entry is generated, each said calculated next predicted effective address being an address for corresponding operand data.

16. The method of claim 15 wherein said step of generating said data prefetch prediction table includes a step of screening from said table generation any opcode instruction that utilizes a non-deterministic addressing mode to calculate said next predicted effective address for said operand data.

17. The method of claim 16 wherein said step of searching includes a step of searching said lowest level cache before any other memory levels and searching said other memory levels in priority order from highest priority to lowest priority.

18. An apparatus for prefetching data to a low level memory of a computer system having multiple memory levels and a processor comprising:

a next data prefetch controller configured to generate a next data prefetch indicator by carrying out a deterministic source addressing mode function of a computer instruction, where said computer instruction has an instruction location indicator and an associated next data prefetch indicator that is calculated by said controller using said deterministic source addressing mode function on said computer instruction;

a store of entries of data prefetch prediction information, each said entry including an association of an instruction location indicator and a next data prefetch indicator for a same computer instruction;

a data prefetch predictor enabled to access said entries for identifying a next data prefetch indicator for a soon to be executed computer instruction using the instruction location indicator of said soon to be executed computer instruction;

a prefetch engine configured to search said memory levels of said computer system to locate data related to said identified next data prefetch indicator for said soon to be executed computer instruction; and a refill manager for transferring said located data related to said next data prefetch indicator for said soon to be executed computer instruction from a higher level memory to a lower level memory.

19. The apparatus of claim 18 wherein said instruction location indicators are program counters and wherein said next data prefetch indicators are next effective addresses.

20. The apparatus of claim 18 wherein said lower level memory is cache memory that is co-located with said processor.

* * * * *